US007536293B2

United States Patent
Zhuo et al.

(10) Patent No.: US 7,536,293 B2
(45) Date of Patent: May 19, 2009

(54) METHODS AND SYSTEMS FOR LANGUAGE TRANSLATION

(75) Inventors: Ming Zhuo, Beijing (CN); Jianfeng Gao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 795 days.

(21) Appl. No.: 10/462,459

(22) Filed: Jun. 16, 2003

(65) Prior Publication Data

US 2004/0167770 A1 Aug. 26, 2004

Related U.S. Application Data

(60) Provisional application No. 60/449,712, filed on Feb. 24, 2003.

(51) Int. Cl.
*G06F 17/28* (2006.01)
*G06F 17/20* (2006.01)

(52) U.S. Cl. .................. 704/2; 704/3; 704/4; 704/7; 704/8

(58) Field of Classification Search .............. 704/2–8
See application file for complete search history.

(56) References Cited

U.S. PATENT DOCUMENTS

| | | | | |
|---|---|---|---|---|
| 5,136,503 A | * | 8/1992 | Takagi et al. ............... | 704/2 |
| 5,659,765 A | * | 8/1997 | Nii ............................. | 704/4 |
| 5,960,382 A | * | 9/1999 | Steiner ....................... | 704/2 |
| 6,081,803 A | * | 6/2000 | Ashby et al. ............... | 707/4 |
| 6,385,568 B1 | * | 5/2002 | Brandon et al. ............ | 704/7 |
| 6,789,057 B1 | * | 9/2004 | Morimoto et al. ......... | 704/2 |
| 6,859,820 B1 | * | 2/2005 | Hauduc et al. ............. | 709/203 |
| 6,904,401 B1 | * | 6/2005 | Hauduc et al. ............. | 704/8 |
| 6,907,256 B2 | * | 6/2005 | Hokao ....................... | 455/463 |
| 6,952,665 B1 | * | 10/2005 | Shimomura et al. ....... | 704/2 |
| 7,107,204 B1 | * | 9/2006 | Liu et al. ................... | 704/2 |
| 7,110,938 B1 | * | 9/2006 | Cheng et al. .............. | 704/5 |

(Continued)

FOREIGN PATENT DOCUMENTS

EP 0953918 A2 11/1999

(Continued)

OTHER PUBLICATIONS

Wahlster, Wolfgang. Mobile Speech-To-Speech Translation of Spontaneous Dialogs. An Overview of the Final Verbmobil System. DFKI GmbH, Saarbrucken, Germany. 1999. pp. 1-19.

(Continued)

*Primary Examiner*—Patrick N Edouard
*Assistant Examiner*—Douglas C Godbold
(74) *Attorney, Agent, or Firm*—Westman, Champlin & Kelly, P.A.

(57) ABSTRACT

A translation service is disclosed, the service being provided to a wireless mobile device through a selective downloading of information from a server. The downloaded information includes a translation architecture having a language independent translation engine and at least one language dependent translation database. The language dependent translation database includes translation templates and a translation dictionary. A specialized database for a selected city or cities in the world can also be downloaded. Translation between languages is realized by applying the language dependent translation database, and optionally the city specific translation database, to the translation engine. The translation engine implements a user-driven term replacement scheme for simplifying the translation process.

13 Claims, 5 Drawing Sheets

U.S. PATENT DOCUMENTS

| | | | |
|---|---|---|---|
| 7,110,939 B2 * | 9/2006 | Ozawa et al. | 704/7 |
| 2001/0012992 A1 * | 8/2001 | Kimpara et al. | 704/5 |
| 2001/0029442 A1 * | 10/2001 | Shiotsu et al. | 704/4 |
| 2002/0111791 A1 | 8/2002 | Candelore | 704/7 |
| 2002/0120436 A1 * | 8/2002 | Mizutani et al. | 704/2 |
| 2002/0188670 A1 * | 12/2002 | Stringham | 709/203 |
| 2002/0198699 A1 * | 12/2002 | Greene et al. | 704/2 |
| 2003/0101044 A1 * | 5/2003 | Krasnov | 704/4 |
| 2003/0149557 A1 * | 8/2003 | Cox et al. | 704/2 |
| 2003/0154069 A1 * | 8/2003 | Carew et al. | 704/7 |
| 2003/0176995 A1 * | 9/2003 | Sukehiro | 704/2 |
| 2003/0212542 A1 * | 11/2003 | Lee et al. | 704/7 |
| 2004/0030543 A1 * | 2/2004 | Kida et al. | 704/8 |
| 2004/0044518 A1 * | 3/2004 | Reed et al. | 704/8 |
| 2006/0167675 A1 * | 7/2006 | Miyahira et al. | 704/2 |

FOREIGN PATENT DOCUMENTS

| | | |
|---|---|---|
| WO | WO 00/57320 | 9/2000 |

OTHER PUBLICATIONS

Suhm and Wiabel. B. & A. Towards a Better Language Models for Spontanous Speech. ASJ 1994. 4 pages.

Suhm, Levin, Coccaro, et al. B., L., & N. "Speech-Language Integration in a Multi-Lingual Speech Translation System." 1994. 8 pages.

Lavie, Levin, Schultz, et al. Alon, Lori & Tanya. "Domain Portability in Speech-To-Speech Translation." 2001. 5 pages.

Ricci, Lawrence. For Applied Data Systems, Inc. A Militarized PDA Voice-To-Voice Phrase Translator. (www.intel.com/pca/developernetwork) vol. 2, Winter 2002. 2 pages.

Electronic Dictionary and Translator Teacher by Ectaco. Inc. pp. 1-9.

Bub and Schwinn, Thomas and Johannes. "Verbmobil: The Evolution of a Complex Large Speech-to-Speech Translation System." 1996. 4 pages.

The Verbmobil Project Phase 1. http://verbmobil.dfki.de/verbmobil/VM.English.Mail.30.10.96.html pp. 1-5.

The Verbmobil Project Phase 2. http://verbmobil.dfki.de/verbmobil/VM2.info.us.html. 3 pages.

Hemming, Cecilia. "Machine translation and corpus-based methods" Term paper. Department of Languages, University College of Skovde. Swedish National graduate school of Language Technology. 2001. pp. 1-6.

IBM Press Room—Press Releases. Press Release from La Jolla California, Sep. 23, 2002. http://www-1.ibm.com/press/PressServletForm.wss?MenuChoice=pressrelease&TemplateN.

Examination Report.

European Search Report.

Second Examination Report.

Official Action from Russian Patent Application 2004105167, filed Feb. 20, 2004.

* cited by examiner

METHODS AND SYSTEMS FOR LANGUAGE TRANSLATION

The present application is based on and claims the benefit of U.S. provisional patent application Ser. No. 60/449,712, filed Feb. 24, 2003, the content of which is hereby incorporated by reference in its entirety.

BACKGROUND OF THE INVENTION

The present invention relates to language translation. In particular, the present invention relates to a translation service that is provided to a device over a network.

In our increasingly connected modern world, specific instances wherein a language barrier makes it difficult to communicate are becoming more and more frequent. A typical scenario is a foreign traveler who cannot understand the native language associated with the country in which they have emerged themselves. It is difficult for such a traveler to communicate with native people even with the simplest sentences. For example, a foreign traveler with no knowledge of the language associated with the country that they are visiting will have a difficult time making daily life communications with the local people to accomplish even simple tasks. Such tasks may include hotel check-in and checkout, taking a taxi, finding a restroom, or exchanging currency, to give just a few examples.

It is expected that the popularity of wireless mobile devices (i.e., Personal Digital Assistants, Pocket PC's, palm computers, handheld computers, smart phones, intelligent mobile phones, etc.) will continue to increase in the future. This increase in popularity is expected to coincide with a decrease in the cost of wireless and 3G communication services.

Accordingly, as time moves on, it will become increasingly desirable to implement an efficient and effective universal language translation system for a mobile device. A device implementing such a system will assist individuals, such as foreign travelers, who desire to overcome challenges posed by language barriers. Technological limitations, however, make it difficult to provide high quality translation for free text (i.e., substantially unlimited text). These limitations must be overcome or sidestepped in order to enable a truly efficient and effective mobile translation system.

SUMMARY OF THE INVENTION

Embodiments of the present invention generally pertain to a mobile language translator that facilitates communication between individuals who speak different languages. Some specific embodiments pertain to a translation service that is provided to a wireless mobile device through a selective downloading of information from a server. The downloaded information includes a translation architecture having a language independent translation engine and at least one language dependent translation database. The language dependent translation database includes translation templates and a translation dictionary. A specialized database for a selected city or cities in the world can also be downloaded. Translation between languages is realized by applying the language dependent translation database, and optionally the city specific translation database, to the translation engine. The translation engine implements a user-driven term replacement scheme for simplifying the translation process.

DETAILED DESCRIPTION OF THE ILLUSTRATIVE EMBODIMENTS

I. Examplary Suitable Computing Device

Figure 1:
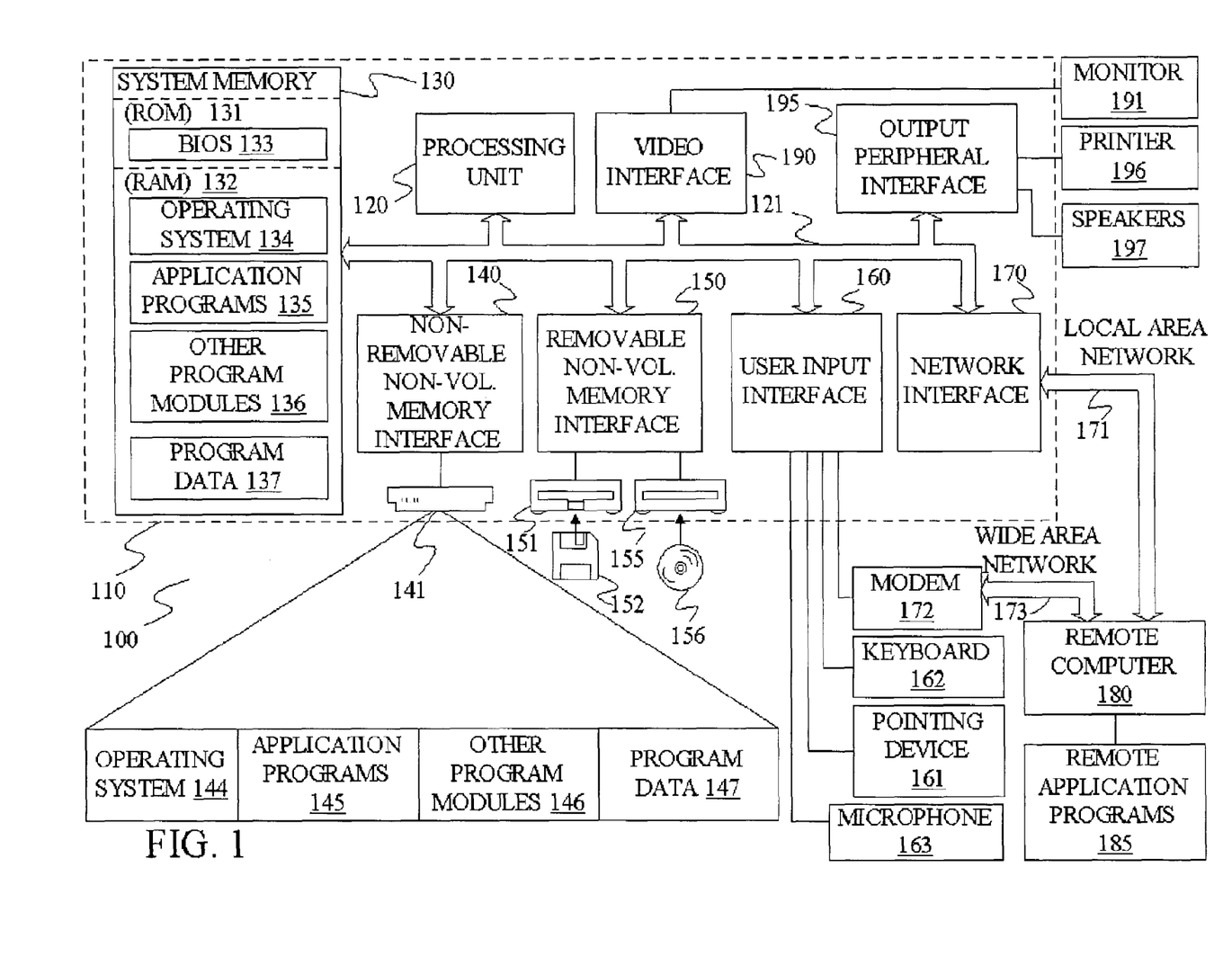
FIG. 1 is a block diagram of an exemplary computing device.

FIG. 1 illustrates an example of a suitable computing system 100 with which embodiments of the present invention may be implemented. The computing system 100 is only one example of a suitable computing system and is not intended to suggest any limitation as to the scope of use or functionality of the invention. Neither should computing system 100 be interpreted as having any dependency or requirement relating to any one or combination of its illustrated components.

With reference to FIG. 1, an exemplary device suitable for the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out in association with a computer system such as that described with respect to FIG. 1. However, the present invention can be similarly carried out in association with a server, a computer devoted to message handling, or on a distributed system in which different portions of the present invention are carried out on different parts of the distributed computing system.

II. Another Examplary Suitable Computing Device

Figure 2:
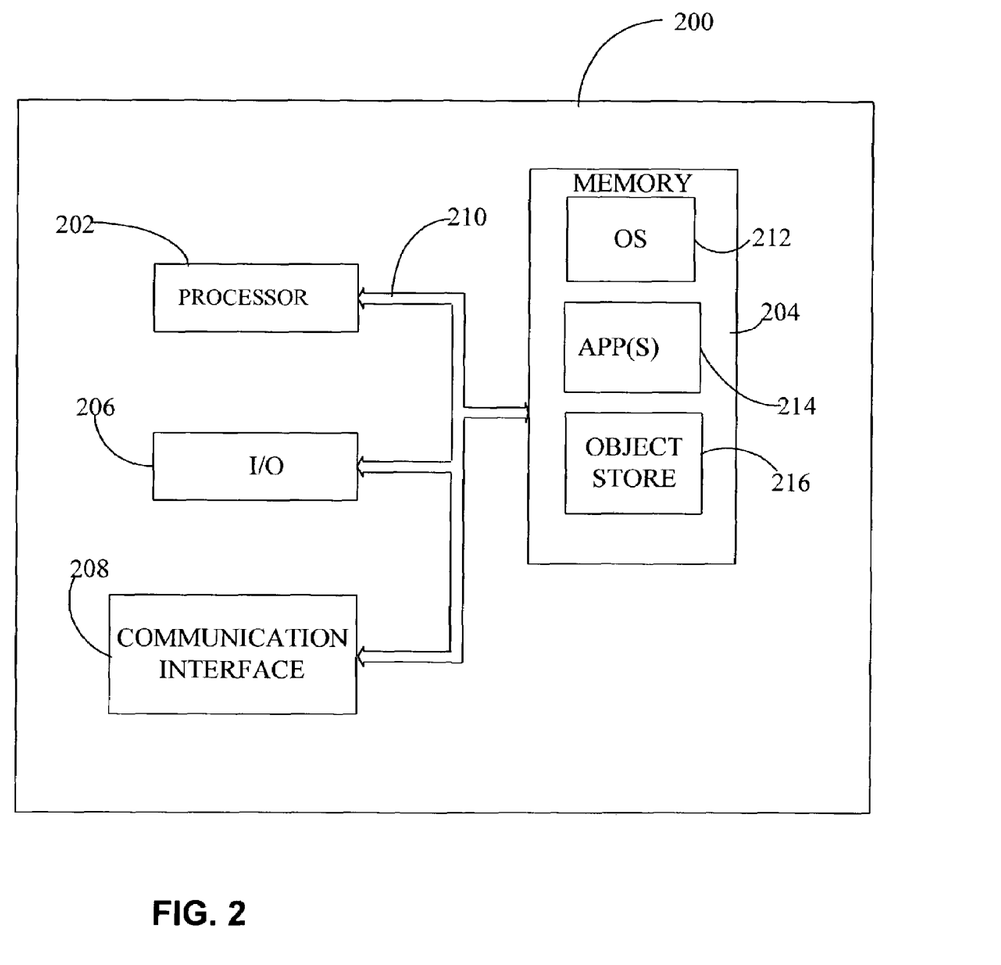
FIG. 2 is a block diagram of an exemplary computing device.

FIG. 2 is a block diagram of a mobile computing device 200. Mobile device 200 includes a microprocessor 202, memory 204, input/output (I/O) components 206, and a communication interface 208 for communicating with remote computers or other mobile devices. In one embodiment, the internal components of device 200 are coupled for communication with one another over a suitable bus 210.

Device 200 is an example of a suitable computing device with which the present invention may be implemented. Device 200 is only one example of such a device and is not intended to suggest any limitation as to the scope of use or functionality of the invention. Neither should device 200 be interpreted as having any dependency or requirement relating to any one or combination of components illustrated in the exemplary device 200.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. Operating system 212 is preferably executed during operation by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 can include any of a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 without departing from the scope of the present invention.

Embodiments of the present invention are operational with numerous general purpose or special purpose computing system environments or configurations other than those illustrated herein. Examples of well-known suitable computing system environments and configurations include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments of the present invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

III. Exemplary Computing System Environment

Figure 3:
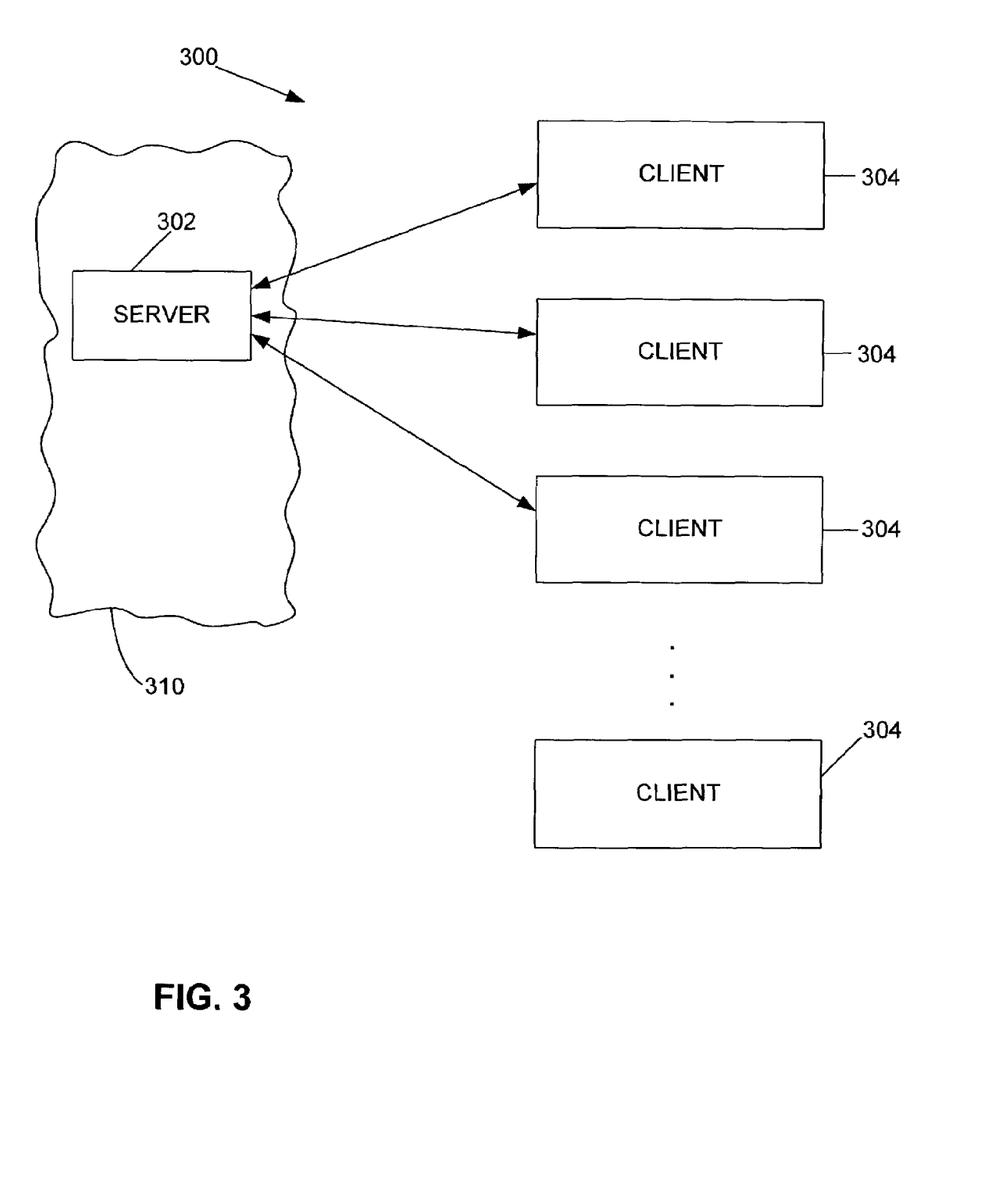
FIG. 3 is a block diagram of an exemplary computing system environment.

FIG. 3 is a block diagram illustrating an example of a suitable computing system environment 300 with which embodiments of the present invention may be implemented. The computing system environment 300 is only one example of a suitable computing environment and is not intended to suggest any limitation as to the scope of use or functionality of the present invention. Neither should the computing environment 300 be interpreted as having any dependency or requirement relating to any one or combination of illustrated components.

Environment 300 includes multiple clients 304. Clients 304 are illustratively, although not necessarily, mobile devices similar to device 200 illustrated in FIG. 2. Clients 304 do not have to be mobile. In accordance with one embodiment, at least one client 304 is a generally non-mobile computing device similar to a PC computer similar to computer 110 in FIG. 1. A given client 304 can be any of the computing devices described above in relation to FIGS. 1 and 2, or some other computing device. In order to simplify the present description of illustrative embodiments, it will be assumed that clients 304 are mobile devices similar to device 200 illustrated in FIG. 2. In addition, it will be generally assumed that communication with clients 304 is through wireless network communication. Non-wireless communication could just as easily be implemented to support communication with either a mobile or non-mobile client 304.

Clients 304 are configured to connect, at least temporarily, to a server 302 that is maintained on a network 310. Clients 304 are illustratively configured to communicate with server 302 via a communication interface, such as interface 208 illustrated in FIG. 2. Server 302 is illustratively configured to provide information, such as application information, to clients 304. Such information can be accessed from application storage 214, and utilized by processor 202 to provide a client user with language translation functionality.

Embodiments of the present invention pertain to a system that enables a client 304 to obtain specialized information, such as application information, from server 302. The specialized information enables the client to operate as a mobile language translator. With the mobile translator, a user of the client 304 has the opportunity to effectuate some form of communication utilizing a particular natural language in which they are not especially fluent. The information received by the client from the server illustratively enables translation between a language that is familiar to the user and at least one foreign language selected by the user. The received information may also include information pertaining to a particular destination (i.e., a city) selected by the user.

Server 302 is configured to provide a practical translation service over a network (i.e., the Internet) to a client 304. Client 304 is illustratively, although not necessarily, a wireless mobile device. The service provided by server 302 to client 304 is illustratively provided on a paid basis (i.e., paid for on a one-time or subscription basis). The translation service illustratively enables the client mobile device to serve its user as a mobile translator. The user can use the mobile translator to enable participation in conversations utilizing a particular natural language in which they are not especially fluent. For example, foreign travelers with no knowledge of the language of the country they are visiting commonly need to make necessary daily life communications with the local people for hotel check-in and checkout, taking a taxi, shopping, etc. The mobile translator enables such travelers to realize such conversations.

As has been described, in order to equip the client 304 to serve a user as a mobile translator, certain application items are transferred from server 304 to client 302 for implementation thereon. The application items illustratively include a language independent translation engine and at least one language dependent translation database. The language dependent database illustratively includes a collection of translation templates and a translation dictionary. The function of the translation templates relates to a particular scheme of translation that will be described in detail below.

The application items transferred from server 304 to client 302 also optionally include one or more specialized databases representing one or more particular destination cities. The specialized database illustratively includes specific words and phrases associated with a destination city, such as particular hotels, street names, restaurants, tourist attractions, etc. Other types of specialized databases (i.e., other than city-based databases) could be implemented without departing from the scope of the present invention.

A user of the client 304 can request transfer of one or more language dependent databases (corresponding to one or more natural languages) along with one or more specialized databases if desired. Following transfer of the application items from server 302 to the client mobile device, translation between languages is realized by applying the language dependent translation database, and optionally any specialized databases, to a translation engine. The translation engine can reside on client 304 long term or be occasionally transferred to client from server 302 (i.e., transferred with a language dependent or specialized database). The translation engine illustratively implements a particular scheme of translation that will be described in detail below.

In accordance with one particular embodiment, an American about to travel to Beijing can download the translation engine, the Chinese-English two way translation templates and dictionary, as well as a Beijing-specific translation dictionary, from the server to his/her wireless mobile device. In Beijing, the American can apply the language dependent translation database and the city-specific translation database to the translation engine in order to facilitate effective communication in Beijing. The translation engine is illustratively language independent.

IV. Federated Translation Scheme

There are many challenges associated with providing high quality translation for free text. In accordance with one embodiment, to circumvent some of these challenges, the translation service provided by server 302 and implemented on a client 304 is based on a "federated translation" scheme. In accordance with the scheme, the translations for typical scenarios are provided. For each typical scenario, typical sentences are collected along with their translations in various foreign languages. Based on these sample sentences, translation is conducted utilizing an example-based translation system.

Figure 4:
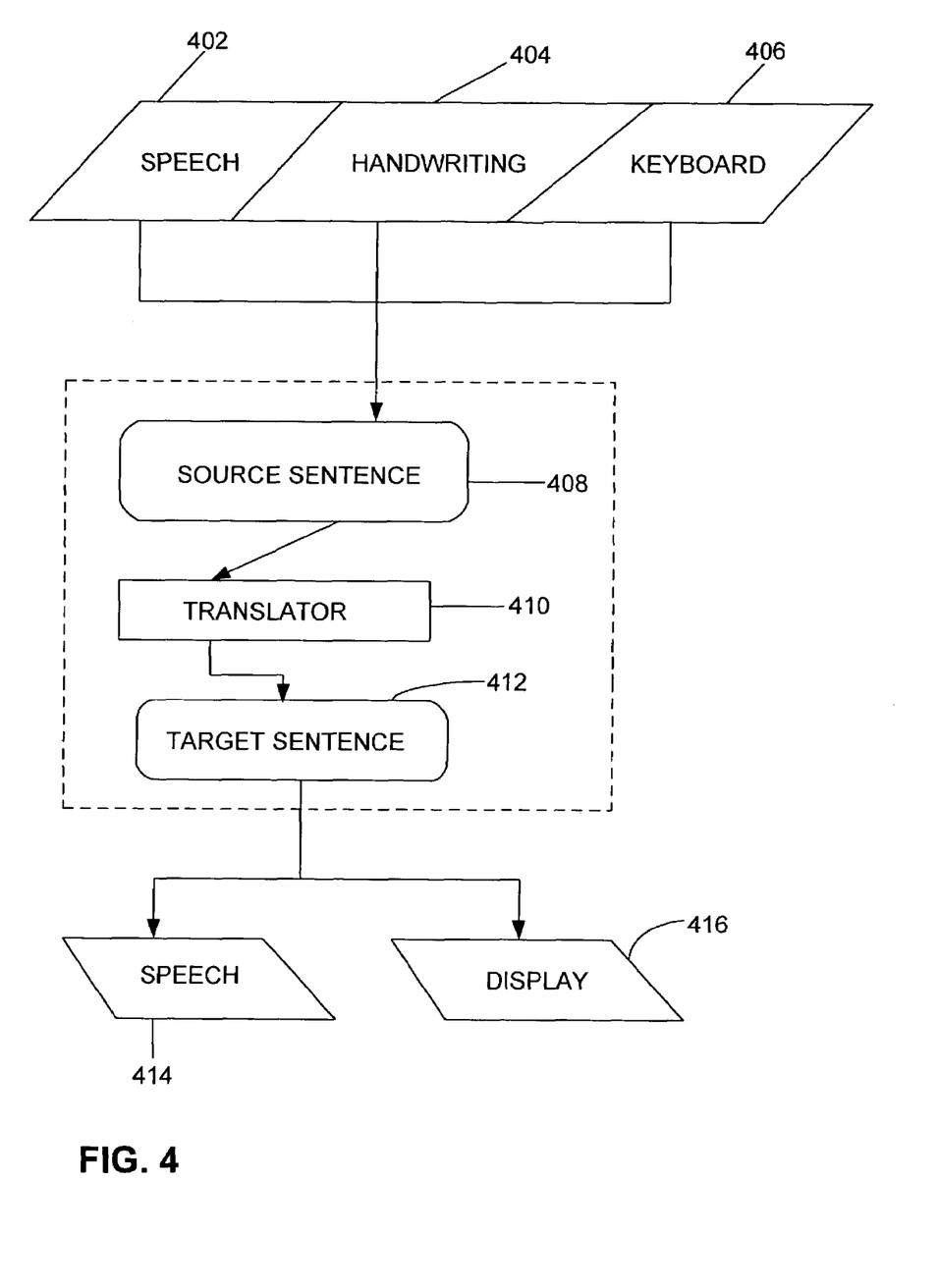
FIG. 4 is a general flow diagram illustrating a flow process from input to translation.

FIG. 4 is a flow diagram generally illustrating the workflow of the federated translation scheme. The first step in the process is for a user of the client to interact with his or her client device so as to accomplish selection of a source sentence 408. As is indicated by blocks 402, 404 and 406, the user can select source sentence 408 through interactions effectuated through speech input, handwriting input and/or keyboard input. Other input methods could be utilized without departing from the scope of the present invention. Source sentence 408 is illustratively selected from the language dependent databases and specialized databases that have been downloaded from server 302 to client 304. Source sentence 408 is illustratively in a language that is familiar to the user.

After source sentence 408 has been selected, translator 410 applies the language independent translation engine to translate the source sentence into target sentence 412. Target sentence 412 is illustratively in the language in which the user desires to effectuate interaction. In accordance with blocks 414 and 416, target sentence 412 is output as speech (i.e., simulated speech) or output on a display to the user of the client device. The user then utilizes that output to effectuate communication in a relatively foreign language. Other forms of output could be generated without departing from the scope of the present invention.

In accordance with one embodiment, selection of source sentence 408 is as simple as direct user input. For example, the user may directly input the source sentence into the client device utilizing a speech, handwriting or keyboard input method. Alternatively, selection of source sentence 408 can be accomplished through a selection process. For example, the client device can provide a listing of categorized source sentences 408 from which the user chooses.

In accordance with one aspect of the present invention, however, the language dependent database downloaded to the client device contains a limited number of sample sentences. If one of those sample sentences exactly matches what the user is looking for, then it can be selected by the user to serve as source sentence 408. Otherwise the user chooses a sample sentence that is reasonably similar to what the user is looking for. Then, the system is configured to enable the user to alter the similar sentence until it is in proper form to serve as source sentence 408. The user illustratively alters the similar sentence by replacing certain sentence elements with elements contained in dictionaries found in the language dependent database and/or the one or more downloaded specialized databases. In this way, the user transforms the similar sentence into a desirable source sentence 408. In other words, selection of a source sentence 408 can be accomplished utilizing a two step process. First, a similar sentence is selected. Then, the similar sentence is modified by replacing, adding and/or deleting terms until the similar sentence is a reasonable or exact approximation of the source sentence 408.

In accordance with one aspect of the present invention, The similar sentence can be selected in at least two ways. First, the sentence database (i.e., part of the language dependent database) can be manually browsed by the user. The browsing process is illustratively facilitated utilizing a category-based menu system. For example, the user may utilize an input device to select a broad category such as "TAXI." Upon selection, a list of sub-categories is presented to the user. The user can move through the menu system until he or she finds a sentence similar to what they are looking for to serve as source sentence 408. The user then modifies the similar sentence until it is in condition to serve as source sentence 408.

Alternatively, however, a user can begin the search for a similar sentence by inputting what they are looking for. The system will then retrieve similar sentences from the database and present them to the user for selection. The user then chooses a sentence that is reasonably similar to what they are looking for. The user then modifies the similar sentence until it is in condition to serve as source sentence 408. For example, the user may input "May I get to the train station quickly by taxi?" The system will then search the sentence database and provide a list such as:

a. "May I get to the hotel by taxi?"
 b. "I get to the train station by bus."
 c. "I get to the train station quickly."

The user then selects a sentence from the list to serve as the similar sentence (i.e., the basis for modification). In one example of modification, the user may choose to modify the slot "the hotel" in sentence "a." to be replaced by "train station." The term "train station" is illustratively a term that is available from the language dependent database for translation.

Figure 5:
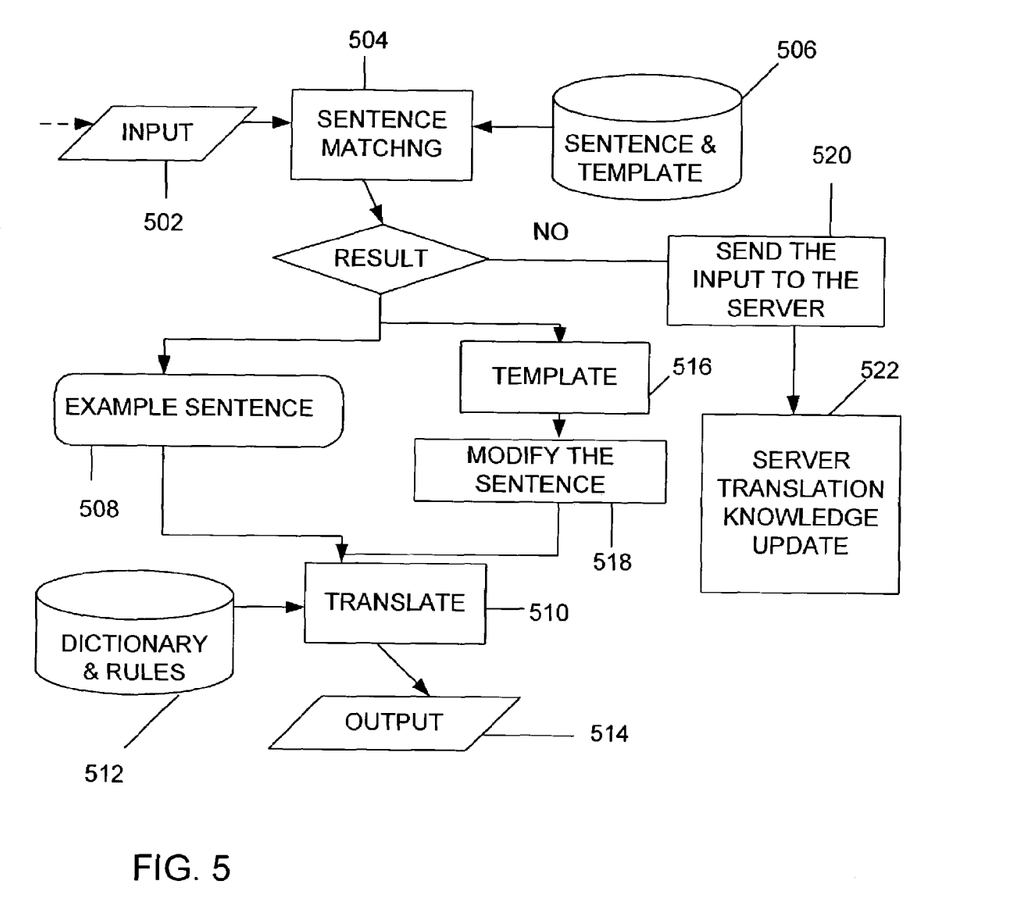
FIG. 5 is a more detailed flow diagram illustrating an overall flow process from input to translation.

FIG. 5, in accordance with one aspect of the present invention, is a flow chart illustrating an overall flow process, wherein an user begins by inputting a sentence they are looking to translate. Block 502 represents the input by the user, which may be accomplished via a speech input, a keyboard input, a handwriting input, or otherwise. Block 504 represents the process of matching the input with sentences and templates 506 stored on the client as part of the language dependent database (and/or part of any specialized database).

Block 508 represents the situation where an exact match is located for the user input. In that situation, in accordance with block 510, dictionary and rules 512, which are illustratively implemented as part of the downloaded language dependent database and independent translation engine, are applied to translate sentence 508 and generate output 514 (i.e., speech or display output).

Block 516 represents the situation where an exact match is not located for the user input, however, a similar match is located. Template 516 represents the similar match retrieved from database 506. In accordance with block 518, the user modifies the similar match until it is a reasonable approximation of the original input 502. Then, in accordance with block 510, the modified sentence is translated into output 514 (i.e., speech or display output).

Block 520 represents the situation where neither an exact match, nor a reasonable estimation, can be located for input 502. In this case, the corresponding input 502 is transferred back to the server. In accordance with block 522, the input is utilized to train the speech dependent databases and/or the specialized databases that are subsequently transferred to other clients.

V. Template Based Machine Translation

In accordance with one aspect of the present invention, the described translation process is realized through a template based machine translation approach, as is generally exemplified by the sample data format of Equation 1:

---
Equation 1

```
<template id = "100002" cntSlot = "2">
<Example_Sentence>
    <es>Can I get back to <slot id="1">the
hotel</slot> quickly from <slot id="2">
here</slot> by taxi? </es>
    <cs>从 <slot id="2"> 这儿
</slot>搭出租车可以很快 回到 <slot id="1"> 旅馆 </slot
> 吗?    </cs>
</Example_Sentence>
</template>
```
---

In accordance with the template based machine translation approach, retrieving a sentence from the language dependent database to approximate a sentence for which a user desires a translation is accomplished through application of an algorithm that accommodates the template based approach. The algorithm generally involves two steps.

The first step of the algorithm is to select candidate sentences using a weighted term frequency/inverse document frequency (TF-IDF) information retrieval approach. The collection of example sentences, hereby denoted as D, consists of a number of documents, wherein each document is actually an example sentence. The indexing result for a document (which contains only one sentence) is represented as a vector of weights:

$$D_i \to (d_{i1}, d_{i2}, \ldots, d_{im}) \quad \text{Equation 2}$$

where $d_{ik}$ ($1 \leq k \leq m$) is the weight of the term $t_k$ in the document $D_i$, and m is the size of the vector space, which is determined by the number of different terms found in the collection. The terms are illustratively, but not necessarily, English words. They could just as easily be Japanese characters, Chinese characters or any other linguistic unit. The weight $d_{ik}$ of a term in a document is calculated according to its occurrence frequency in the document (tf—term frequency), as well as its distribution in the entire collection (idf—inverse document frequency). There are multiple methods that can be utilized to calculate $d_{ik}$. For example, the following formula can be utilized:

$$d_{ik} = \frac{[\log(f_{ik}) + 1.0] * \log(N/n_k)}{\sqrt{\sum_j [(\log(f_{jk}) + 1.0) * \log(N/n_k)]^2}} \quad \text{Equation 3}$$

where $f_{ik}$ is the occurrence frequency of the term $t_k$ in the document $D_i$; N is the total number of documents in the collection; and $n_k$ is the number of documents that contain the term $t_k$.

A query (which in the present case corresponds to the sentence for which the user desires a translation) is indexed in a similar way, and a vector is also obtained for the query:

$$Q_j \to (q_{j1}, q_{j2}, \ldots q_{jm}) \quad \text{Equation 4}$$

Similarity between $D_i$ and $Q_j$ is then calculated as the inner product of their vectors, that is:

$$Sim(D_i, Q_j) = \sum_k (d_{ik} * q_{jk}) \quad \text{Equation 5}$$

The output is a set of sentences S, where:

$$S = \{D_i | Sim(D_i, Q_j) > \delta\} \quad \text{Equation 6}$$

The second step of the algorithm is to utilize a weighted edit distance approach to re-rank the selected sentence set. Given a selected sentence $D_i \to (d_{i1}, d_{i2}, \ldots, d_{im})$, the edit distance between $D_i$ and $Q_j$, denoted as $ED(D_i, Q_j)$, is defined as the minimum number of insertions, deletions and replacements of terms necessary to make two strings A and B equal. Specifically, $ED(D_i, Q_j)$ is defined as the minimum number of operations required to change $D_i$ into $Q_j$, where an operation is one of:

1. change a term;
2. insert a term; or
3. delete a term.

The dynamic programming algorithm is illustratively utilized to compute the edit distance of two strings. A two-dimensional matrix, m[0...|S1|, 0...|S2|] is used to hold the edit distance values:

$$m[i, j] = ED(s1[1 \ldots i], S2[1 \ldots j]) \quad \text{Equation 7}$$

$$m[0, 0] = 0$$

$$m[i, 0] = i, i = 1 \ldots |S1|$$

$$m[0, j] = j, j = 1 \ldots |S2|$$

$$m[i, j] = \min(m[i-1, j-1] +$$

$$\text{if } S1[i] = S2[j] \text{ then } 0 \text{ else } 1,$$

$$m[i-1, j] + 1,$$

$$m[i, j-1] + 1), i = 1 \ldots |S1|, j = 1 \ldots |S2|$$

m[,] is illustratively computed row by row. Row m[i,] depends only on row m[i−1,]. The time complexity of this algorithm is O(|s1|*|s2|). If s1 and s2 have a 'similar' length in terms of term number, about 'n' for example, this complexity is $O(n^2)$.

The weighted edit distance generally refers to the fact that the penalty of each operation (insert, delete, substitute) is not necessarily 1, but can be assigned different values based on the significance of the related terms. For example, the following penalty value list can be utilized to assign values according to a particular part-of-speech as follows:

| POS | Score |
| --- | --- |
| Noun | 0.6 |
| Verb | 1.0 |
| Adjective | 0.8 |
| Adverb | 0.8 |
| Preposition | 0.8 |
| Others | 0.4 |

This list is exemplary only can be modified to accommodate a given application. The sentences $S=\{D_i,|\text{Sim}(D_i,Q_j)\geq \delta\}$ selected by TF-IDF approach are illustratively ranked by the weighted edit distance ED, and an ordered list is obtained:

$$T=\{T_1,T_2,T_3,\ldots T_n\} \text{ Where, } ED(T_i,Q_j)\geq ED(T_{i+1},Q_j)$$
$$1\leq i\leq n$$
Equation 8

The ordered list is illustratively utilized as the basis for determining which similar sentence or sentences should be submitted to the user to facilitate the described template based translation process.

Although the present invention has been described with reference to preferred embodiments, workers skilled in the art will recognize that changes may be made in form and detail without departing from the spirit and scope of the invention.

What is claimed is:

1. A method of providing a language translation service to a user of a client computing device, the method comprising:
   receiving from the user an input that is a language selection;
   receiving from the user an input that is a specialized database selection, wherein the
      specialized database selection is indicative of a particular geographic region to which data in a specialized database is customized to represent, the specialized database including words associated with specific locations in the particular geographic region;
   transmitting a request from the client computing device to a server, wherein the request is indicative of the language selection and the specialized database selection;
   receiving from the server, in response to the request, a language dependent database that corresponds to the language selection;
   receiving from the server, in response to the request, the specialized database;
   providing the user with access to a collection of sample sentences that are contained within the language dependent database and are in a language that is familiar to the user;
   receiving from the user a selection input that identifies a sample sentence that is similar but not identical to a target sentence for which the user desires a translation;
   receiving from the user an additional input that identifies a term in the specialized database;
   modifying the sample sentence in accordance with the additional input to make the sample sentence a closer approximation of the target sentence, wherein modifying the sample sentence comprises at least one of deleting or replacing a term in the sample sentence to create a modified sample sentence;
   operating the client computing device to utilize a language independent translation engine in association with the language dependent database to perform language translation; and
   wherein utilizing a language independent translation engine in association with the language dependent database comprises translating the sample sentence by utilizing the language independent translation engine to apply to the sample sentence a translation dictionary contained within the language dependent database.

2. The method of claim 1, wherein receiving the specialized database comprises receiving the specialized database having translation information that pertains to a particular destination, wherein the translation information includes a translation dictionary customized to represent the particular destination, and wherein the translation dictionary includes words associated with at least one of a hotel, street name, restaurant, and tourist attraction associated with the particular destination.

3. The method of claim 2, wherein receiving the specialized database comprises receiving the specialized database having translation information that pertains to a particular city.

4. The method of claim 1, further comprising receiving the language independent translation engine from the server.

5. The method of claim 4, wherein receiving the language independent translation engine comprises receiving the language independent translation engine with the language dependent database.

6. The method of claim 1, wherein providing the user with access to a collection of sample sentences comprises providing the user with access to a categorized collection of sample sentences.

7. The method of claim 1, wherein providing the user with access to a collection of sample sentences comprises providing the user with access to a categorized collection of sample sentences.

8. The method of claim 1, wherein utilizing a language independent translation engine in association with the language dependent database comprises translating the sample sentence by utilizing the language independent translation engine to apply to the modified sample sentence a translation dictionary contained within the language dependent database.

9. The method of claim 1, further comprising:
   receiving from the user a target input that represents text for which the user desires a translation;
   searching a collection of sample texts that are contained within the language dependent database; and
   identifying a sample text that is at least substantially similar to the target input.

10. The method of claim 9, wherein utilizing a language independent translation engine in association with the language dependent database comprises translating the sample text by utilizing the language independent translation engine to apply to the sample text a translation dictionary contained within the language dependent database.

11. The method of claim 9, wherein identifying a sample text comprises:
   identifying a plurality of sample texts that are approximations of the target text;
   presenting the plurality of sample texts to the user; and
   receiving from the user a selection input that identifies one of the plurality of sample texts.

12. The method of claim 9, wherein utilizing a language independent translation engine and the language dependent database comprises translating said one of the plurality of sample texts by utilizing the language independent translation engine to apply a translation dictionary contained within the language dependent database.

13. The method of claim 9, further comprising:
   receiving from the user a manipulation input;
   modifying said one of the plurality of sample texts in accordance with the manipulation input to make it a closer approximation of the target sentence.

* * * * *